(12) United States Patent
Massey

(10) Patent No.: US 8,459,740 B2
(45) Date of Patent: Jun. 11, 2013

(54) ADJUSTABLE-HEIGHT SUPPORT MEMBER

(76) Inventor: Revis Jimmy Massey, Boyd, TX (US)

( * ) Notice: Subject to any disclaimer, the term of this patent is extended or adjusted under 35 U.S.C. 154(b) by 335 days.

(21) Appl. No.: 12/860,488

(22) Filed: Aug. 20, 2010

(65) Prior Publication Data

US 2011/0091681 A1     Apr. 21, 2011

Related U.S. Application Data

(60) Provisional application No. 61/279,299, filed on Oct. 19, 2009.

(51) Int. Cl.
*B32B 5/02* (2006.01)
*B21D 47/00* (2006.01)

(52) U.S. Cl.
USPC .................................. 297/344.12; 297/344.1

(58) Field of Classification Search
USPC ......................................... 297/344.12, 344.1
See application file for complete search history.

(56) References Cited

U.S. PATENT DOCUMENTS 5,720,524 A  *  2/1998  Hall ............................... 297/338

* cited by examiner

*Primary Examiner* — Brent O'Hern
(74) *Attorney, Agent, or Firm* — James E. Walton; Damon R. Hickman

(57) ABSTRACT

An adjustable-height support member, also referred to as a chair, provides support in a panel assembly having an inner wall and an outer wall. The chair includes a base configured for attachment to an interior surface of the inner wall. A shaft extends from the base. An optional cap covers the shaft such that the total length of the chair corresponds with a desired thickness between the inner wall and the outer wall of the panel assembly. During assembly, the chair prevents sagging between the inner wall and the outer wall. The chair also allows the insulating foam to be applied so as to substantially fill the void between the inner and outer wall.

6 Claims, 4 Drawing Sheets

ADJUSTABLE-HEIGHT SUPPORT MEMBER

CROSS REFERENCE TO RELATED APPLICATIONS

This application claims the benefit of U.S. Provisional Application No. 60/279,299, filed 19 Oct. 2009, titled "Tri-Chair and cap," which is hereby incorporated by reference for all purposes as if fully set forth herein.

BACKGROUND

1. Field of the Invention

The system of the present application relates to a method and apparatus for supporting flexible panel members during assembly.

2. Description of Related Art

A typical walk-in refrigerator includes a series of insulated panels attached together to form an enclosure. A basic insulated panel typically includes an outer wall and an inner wall with insulating foam therebetween. During assembly of the insulated panel, the outer wall and the inner wall have a tendency to sag or otherwise distort before the insulating foam can be used to rigidly fill the void between outer and inner walls.

Although great strides have been made in the area of insulated panel assemblies, considerable shortcomings remain.

DESCRIPTION OF THE DRAWINGS

The novel features believed characteristic of the system are set forth in the description. However, the system itself, as well as, a preferred mode of use, and further objectives and advantages thereof, will best be understood by reference to the following detailed description when read in conjunction with the accompanying drawings, wherein.

Figure 1:
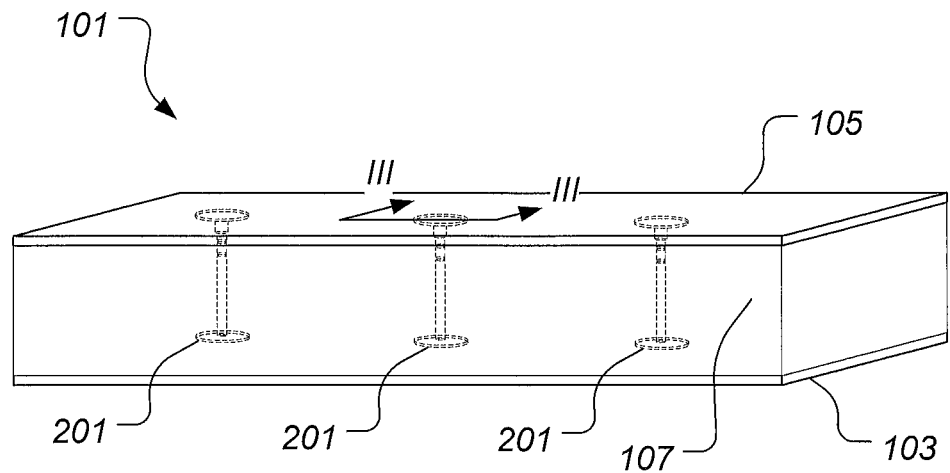
FIG. 1 is a partial perspective view of a panel assembly according the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the system as described herein.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1 in the drawings, a preferred embodiment of an insulated panel assembly 101 is illustrated. Insulated panel assembly 101 includes an inner wall 103, an outer wall 105, and an insulating material 107 therebetween. Panel assembly 101 also includes side walls (shown in FIG. 7) around the perimeter for support of inner wall 103 and outer wall 105. Side walls also contribute to entrapment of insulting material 107. Insulated panel assembly 101 further includes at least one chair 201 for supporting inner wall 103 and outer wall 105 during assembly. Chair 201 is an adjustable height support member configured to prevent sagging between inner wall 103 and outer wall 105. Chair 201 is configured to provide the necessary support while also facilitating application of insulating material 107, which is discussed in further detail herein.

Figure 2:
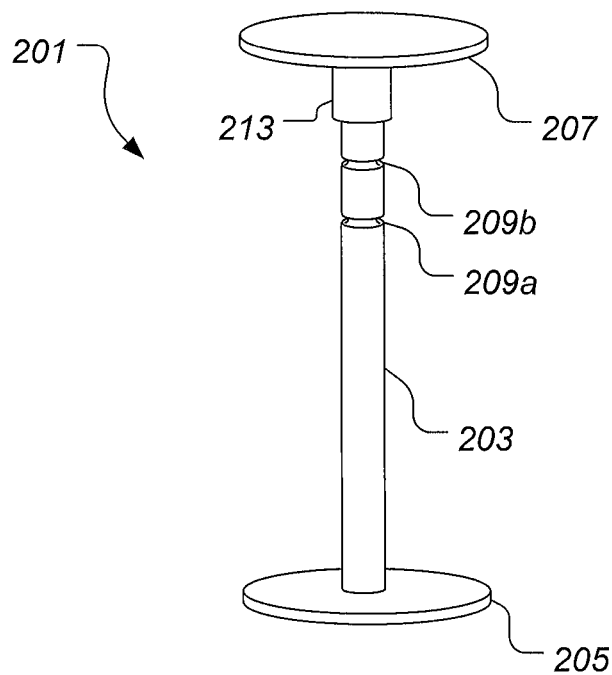
FIG. 2 is a perspective view of an adjustable-height support member according the preferred embodiment of the present application.
Figure 3:
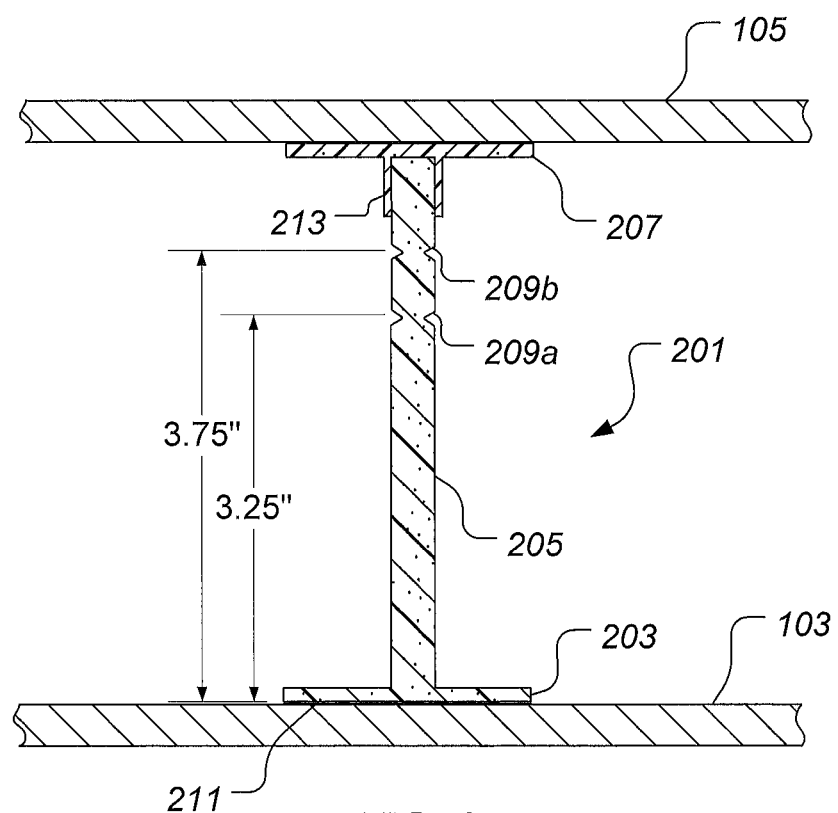
FIG. 3 is a cross-sectional view of an adjustable-height support member in the panel assembly, taken along section lines III-III in FIG. 1, according the preferred embodiment of the present application.

Referring to FIGS. 2 and 3 in the drawings, a preferred embodiment of chair 201 is illustrated. Chair 201 includes a base 205 which is preferably integral to a shaft 203. It should be appreciated that alternative embodiments of chair 201 may include a base 205 which is separate and removable from shaft 203. The preferred embodiment of chair 201 includes an optional removable cap 207; however, it should be appreciated that alternative embodiments may not include cap 207. Cap 207 is configured to prevent denting in outer wall 105. However, some panel assemblies may use an outer wall 105 having a thickness that is not susceptible to denting, as such; cap 207 is not required in those applications. Cap 207 is removable attached to shaft 203. For example, cap 207 preferably includes a female portion 213 for receiving shaft 203 in a press fit manner that requires a small amount of force to assemble and disassemble. In alternative embodiment, cap 207 may be threaded, snap-locked, or twist-locked onto shaft 203. Cap 207 may have a variety of shapes and configurations, such as u-shaped in order to receive a rod or stringer. Chair 201 is preferably fabricated with a plastic material, such as recycled polypropylene, in a molding process. It should be appreciated that other materials and compositions may be used in lieu of recycled polypropylene. Shaft 203 preferably has a circular cross section; however, alternative embodiments may have other cross sectional shapes, such as square, triangular, and the like. Also, shaft 203 may be formed from two or more shaft members. Shaft 203 is configured to provide axial strength to keep outer wall 105 from sagging toward inner wall 103, while also minimize any fluid flow disturbances during injection of insulating material 107, as described further herein.

Still referring to FIGS. 2 and 3 in the drawings, the height of chair 201 may be selectively adjusted to correspond with the desired thickness between inner wall 103 and outer wall 105. For example, in the preferred embodiment shaft 203 includes at least one indicator, such as yield region 209a. A first yield region 209a is shown at approximately 3.25 inches from base 205. A second yield region 209b is shown at approximately 3.75 inches from base 205. Yield regions 209a and 209b are reduced diameter regions configured to yield upon application of a bending force. More specifically, yield regions 209a and 209b are configured to provide a breaking point when subjected to a certain bending force, but still withstand axial load from the weight of an outer wall 105. Yield regions 209a and 209b allow chair 201 to be selectively used in a variety of panel assembly widths. For example, an assembly worker may simply exert bending pressure above a certain yield region so as to shorten shaft 203 to the desired height. Alternative embodiments of chair 201 may have a fewer or greater number of yield regions, or other indicators as described herein.

Chair 201 further includes a bonding member 211 (shown in FIG. 3) to facilitate attachment of base 205 to inner wall 103. It is preferred that bonding member 211 be in the form of double-side tape having a thin region of foam insulation between the two tape surfaces. The foam insulation in the double-sided tape provides insulating properties, as well as flexibility to compensate for misalignments and other tolerance uncertainties. It should be appreciated that the thickness of the double-side tape should be factored into the total height of chair 201. In alternative embodiments, bonding member 211 may be double-side tape without foam insulation. Chair 201 preferably includes bonding member 211 in the form of double-sided tape with one tape surface already bonded to base 205. Therefore, installation of chair 201 simply requires the peeling back of a release liner so as to expose the remaining tape surface, and then placing the chair 201 onto inner wall 103 so that bonding member 211 bonds chair 201 to inner wall 103. Other embodiments of chair 201 may not include bonding member 211 as part of chair 201. For example, bonding member 211 may be applied to base 205 or inner wall 103 during installation of chair 201. As such, bonding member 211 may be a wide variety of forms, including liquid and paste forms of adhesive.

Figure 4:
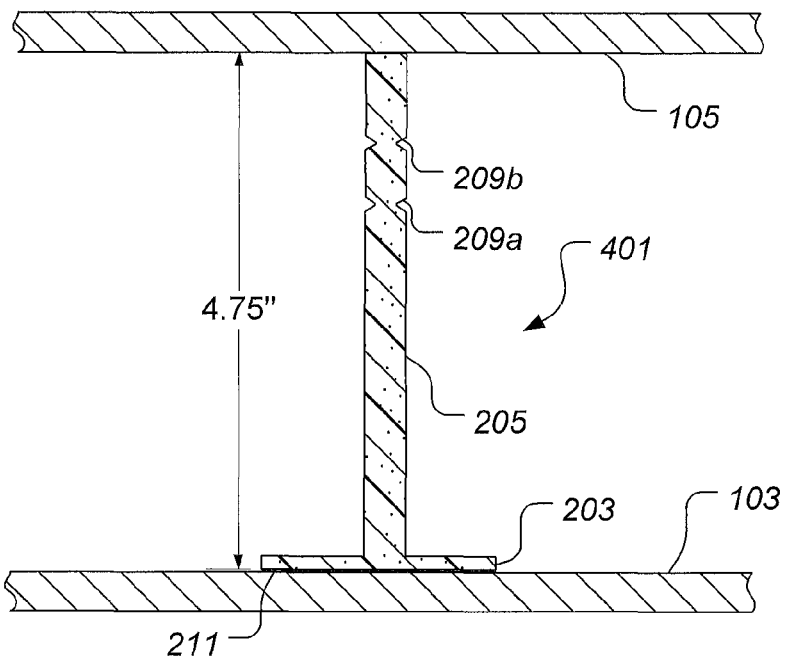
FIG. 4 is a sectional view of an adjustable-height support member in a panel assembly according an alternative embodiment of the present application.

Referring to FIG. 4, an alternative embodiment of a chair 401 is illustrated. Chair 401 is similar to chair 201, except that cap 207 is excluded. As shown in FIG. 4, shaft 205 is used to support outer wall 105 instead of cap 207. Chair 401 is particularly well suited for panel assemblies having an outer wall 105 of significant thickness or hardness that would prevent denting from contact with shaft 205.

Figure 5:
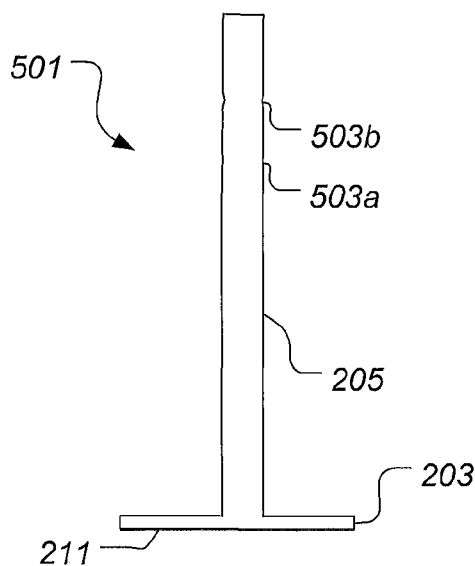
FIG. 5 is a side view of an adjustable-height support member according an alternative embodiment of the present application.
Figure 6:
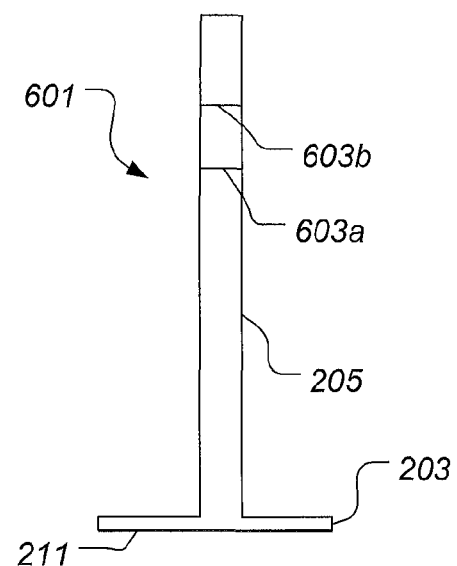
FIG. 6 is a side view of an adjustable-height support member according an alternative embodiment of the present application.

Referring to FIGS. 5 and 6, alternative embodiments of chair 201 are illustrated. A chair 501 (shown in FIG. 5) is similar to chair 401 except indicators used to selectively change the height of shaft 205 are indentations 503a and 503b. Indentations 503a and 503 are configured to facilitate the cutting or sawing of shaft 205 in order to change the height of chair 501. Indentations 503a and 503b provide a visual cutting line, as well as a physical indentation to help guide the cutting or sawing device. Further, a chair 601 (shown in FIG. 6) is similar to chair 401 except indicators used to selectively change the height of shaft 205 are visible marks 603a and 603b. Visible marks 603a and 603a are markings on shaft 203 which provide a visible indicator to locate the line for cutting or sawing of shaft 203. For example, marks 603a and 603b may each be a colored line around the circumference of shaft 205.

Figure 7:
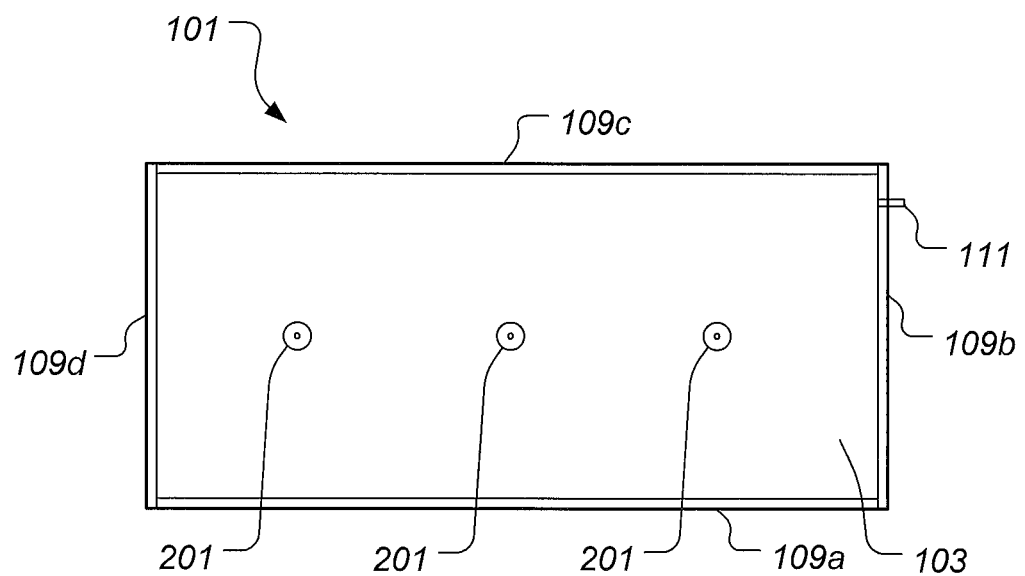
FIG. 7 is a partial top view of a panel assembly according the preferred embodiment of the present application.

Referring now to FIG. 7, a partial top view of panel assembly 101 is used to illustrate a method of manufacturing a panel assembly 101 with an adjustable-height support member, such as chair 201. During fabrication of panel assembly 101, inner wall 103 is laid upon a preferably flat and level surface. Side walls 109a-d are used to provide structurally integrity to assembly 101, as well as define a volume for insulating material 107. After side walls 109a-d are attached to inner wall 103, one or more chairs 201 are installed to prevent sagging of outer wall 105 (shown in FIG. 1). In the preferred embodiment, double-sided tape is used as bonding member 211 for bonding base 205 of chair 201 onto inner wall 103. As shown in FIG. 7, chairs 201 are bonded onto inner wall 103 in strategic locations.

The method of manufacturing a panel assembly 101 further includes adjusting the length of each chair 201, if necessary. As previously described, chair 201 is configured to be adjustable. Portions of shaft 203 may be removed to shorten chair 201 to correspond with an inner thickness of panel assembly 101. Such a feature of chair 201 allows it to be used in a variety of panel assemblies 101 of varying thicknesses, thereby preventing a manufacturer from having to stock multiple support members, each of unique length. Chair 201 is configured to be shortened by applying a bending force to snap off a portion of shaft 203 in order to shorten chair 201. Chair 501 is configured to be shortened by cutting, sawing, or the like, at the indentations. Chair 601 is configured with visible marks which provide a visual guide as a location for cutting, sawing, or the like. It should be appreciated that other alternative embodiments of chair 201 may not include any indicator; instead, such an embodiment may employ the use of an external tool for cutting each chair to a predetermined length, as set by a feature on the tool.

Referring still to FIG. 7, after each chair 201 is attached to inner wall 103, outer wall 105 is attached to form a box-like structure. Chairs 201 prevent the sagging of outer wall 105 towards inner wall 103 so as to form a panel assembly 101 with substantially uniform thickness. Next, insulating material 107 is injected into panel assembly 101 via one or more ports 111. Preferably, insulating material 107 is injected in a fluid state. Each chair 201 is configured to have a small cross-sectional area in order to provide the least amount of resistance during the injection of insulating material 107, while also providing the necessary axial strength to prevent outer wall 105 from sagging. The narrow diameter of shaft 203 allows insulating material 107 to flow around chair 201 in order to prevent the formation of voids in the insulating material 107. The adhesive bond between base 205 and inner wall 103 keeps chair properly attached during the injection of insulating material 107. In the preferred embodiment, the diameter of base 203 is 1.5 inches. However, it should be appreciated that the size of base 203, and other features of chair 201, may vary in size. After insulating material 107 is injected into panel assembly 101, insulating material 107 is allowed to dry, expand, and become substantially rigid. As such, each chair 201 remains embedded within and form a part of the panel assembly 101.

It is apparent that a system with significant advantages has been described and illustrated, including a convenient device and method for preventing the sagging of walls during assembly of a insulate panel.

The particular embodiments disclosed above are illustrative only, as the system may be modified and practiced in different but equivalent manners apparent to those skilled in the art having the benefit of the teachings herein. The particular embodiments disclosed herein may be altered or modified, and all such variations are considered within the scope and spirit of the present application. Although the system of the present application is shown in a limited number of forms, it is not limited to just these forms, but is amenable to various changes and modifications without departing from the spirit thereof.

I claim:

1. A chair for providing support in a panel assembly, the panel assembly having an inner wall and an outer wall, the chair comprising:
   a base configured for attachment to an interior surface of the inner wall;
   a shaft integrally extending from the base; and
   an indicator configured for facilitating the changing of a length of the shaft in which a predetermined portion of the shaft may be removed;
   wherein the chair is configured to provide support between the inner wall and the outer wall, so as to resist sagging between the inner wall and outer wall during manufacturing of the panel assembly; and
   wherein the indicator is an indentation in the shaft located on a plane parallel to the base, the indentation configured to facilitate a cutting off of the predetermined portion of the shaft, thereby changing the length of the shaft.

2. The chair according to claim 1, further comprising:
   a cap portion removably coupled to the shaft, the cap portion being configured to interface with an interior surface of the outer wall.

3. The chair according to claim 1, further comprising:
   a bonding member located on the base portion for bonding the chair to the interior surface of the inner wall.

4. The chair according to claim 3, wherein the bonding member is double sided tape.

5. The chair according to claim 3, wherein the bonding member is an insulating tape having a first side bonded to the base portion, a second side with a release liner configured to selectively expose an adhesive, and an insulating material between the first side and the second side.

6. The chair according to claim 1, further comprising:
   a bonding member located on the base portion for bonding the chair to the interior surface of the inner wall;
   wherein a diameter of the base is larger than a diameter of the shaft, the diameter of the shaft being configured to promote the application of an insulation around the chair and between the inner wall and the outer wall;
   wherein the chair is configured to resist sagging between the inner wall and outer wall through by contact between the shaft and the outer wall; and
   wherein the shaft is substantially cylindrical.

* * * * *